United States Patent Office 3,162,615
Patented Dec. 22, 1964

3,162,615
POLYESTERS FROM CYCLIC POLYHALOALKANE POLYOLS AND UNSATURATED DICARBOXYLIC ACIDS
Bart J. Bremmer, Midland, Mich., assignor to The Dow Chemical Company, Midland, Mich., a corporation of Delaware
No Drawing. Filed Jan. 3, 1961, Ser. No. 79,989
8 Claims. (Cl. 260—47)

This invention relates to new polyesters prepared from cyclic and/or aromatic polyhaloalkane polyols and unsaturated dicarboxylic acids or anhydrides. It relates more particularly to resinous polyesters prepared by reacting substantially a stoichiometrically equivalent quantity of an unsaturated poly-basic carboxylic acid or an anhydride thereof with cyclic and/or aromatic polyhaloalkane polyols which aromatic bis-haloalkanols have the general formula:

(1)
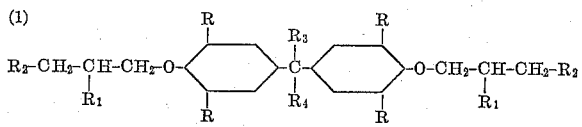

wherein R represents a member of the group consisting of H, Cl, and Br, $R_1$ and $R_2$ each represents a member of the group consisting of Cl, Br and OH, with the proviso that when one of the $R_1$ and $R_2$ groups is halogen the other is OH, and $R_3$ and $R_4$ each represents a member of the group consisting of H and lower alkyl radicals containing from 1 to 4 carbon atoms, and which cyclic aliphatic polyhaloalkane polyols have the general formula:

(2)
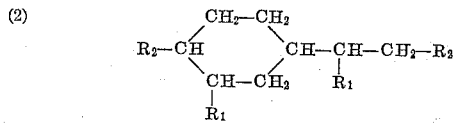

wherein $R_1$ and $R_2$ have the meaning given above.

The cyclic aliphatic polyhaloalkane polyol starting material may be prepared by a procedure similar to that described in Example 11 of U.S. Patent No. 2,765,296.

In brief, the cyclic aliphatic polyhaloalkane polyol or cyclic dichlorohydrin starting material may be prepared by reacting hypochlorous acid with 4-vinylcyclohexene in an aqueous medium at temperatures of from about 5° to about 8° C. under atmospheric pressure with separation of the product from the reaction mixture in the usual ways, e.g. by extraction with ether. A typical cyclic aliphatic polyhaloalkane polyol may have the structural formula:

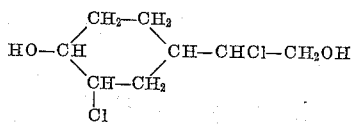

The aromatic polyhaloalkane polyol starting materials are derived from bisphenols. They may readily be prepared by the reaction of a diglycidyl ether of a bisphenol or a halogen-substituted bisphenol and a hydrohalic acid such as hydrogen chloride or hydrogen bromide or an aqueous solution of such hydrohalic acids. The reaction may be carried out in an organic liquid such as benzene, toluene, xylene and the like at temperatures between about 10° and about 100° C. under atmospheric pressure or thereabout. The product may be separated from the reaction mixture in the usual ways, e.g. by distillation to remove and separate the organic liquid reaction medium.

More specifically, it would be well to maintain the temperature of the reaction mixture within a range of from about 10° to about 100° C. under atmospheric or substantially atmospheric pressures. For best results, reaction should be allowed to continue for a period of 1 hour or less. Thereafter, the reaction may be terminated by distilling off the inert solvent with the water of reaction while gradually increasing the reaction temperature to approximately 120° C. under vacuum.

The aromatic polyhaloalkane polyol produced by employing the foregoing reaction procedure varies in consistency from off-white or slightly yellow, clear, viscous liquids to light amber color, clear, solid resins, with Gardner color values ranging between about 4.0 and about 11.

Advantageously, the aromatic polyhaloalkane polyol products are obtained in substantially quantitative yields, based on the weight of the aromatic diepoxide starting material. The observed hydroxyl content of the instant polyols is shown to be in close agreement with the theoretical hydroxyl content.

Comparable polyols may be conveniently produced by admixing predetermined amounts of a bisphenol, epichlorohydrin, and a condensation catalyst in an appropriate type reaction vessel capable of holding a vacuum. The reaction vessel is fitted with a means of stirring, a thermometer, reflux condenser, and a means of heating.

The charge is caused to react by maintaining the temperature of the reaction mixture within the range of between about 25° C. and 100° C. at atmospheric or substantially atmospheric pressures for a period of from about 4 to about 48 hours. The reaction is usually terminated by removing the unreacted epichlorohydrin by distillation under vacuum while gradually increasing the temperature of the reactants to a temperature of approximately 130° C.

Frequently, all the epoxy terminal groups do not convert to hydroxyl groups when the above method is employed. Rather, a dehydrochlorination reaction occurs which changes some of the chlorohydrin groups to corresponding epoxy groups. This dehydrochlorination reaction may be easily and conveniently corrected by adding a minimum amount of a hydrohalic acid and allowing the acid to react and revert the epoxy groups to the desired chlorohydrin.

Just as in the method of preparation of aromatic polyhaloalkane polyols from a diepoxide and a hydrohalic acid, it is likewise advisable to have the diepoxide dissolved in an inert organic solvent. So, too, when the alternate method for preparing aromatic polyhaloalkane polyols from bisphenols and epichlorohydrin is used, it is again advantageous to have the epoxy reaction product dissolved in an excess of epichlorohydrin. In order to isolate the desired polyol reaction product, it is well to remove the inert organic solvent from the system by distillation under vacuum.

The aromatic polyhaloalkane polyol products, prepared by means of the alternate method, likewise vary from viscous liquid resins to solid resinous products. The resinous products range in color from clear yellow to a light amber color, or from about 4 to about 11 on the Gardner scale. Advantageously, the resinous products are obtained in quantitative yield, based on the weight of the bisphenol starting material. In addition, the observed hydroxyl content of these aromatic polyhaloalkane polyols is found to be in close agreement with the theoretical hydroxyl content as calculated.

The unsaturated polyester resinous products of the invention may be prepared by admixing substantially stoichiometrically equivalent quantities of one or more cyclic aliphatic or aromatic polyhaloalkane polyols having the aforementioned general formulae and an unsaturated dicarboxylic acid or anhydride such as maleic, fumaric, itaconic or citraconic acid or maleic, itaconic or citraconic anhydrides in an inert, water-immiscible organic liquid reaction medium. The ingredients are charged into a convenient size reactor equipped with a means of agitating, a thermometer, a means of heating, a water trap, a reflux condenser, and a gas inlet tube. The inert, water-immiscible organic liquid acts as a reaction vehicle and it also forms azeotropic mixtures with the water produced in the reaction. Throughout the course of the reaction, the azeotropes, as formed, are continuously removed from the reaction system by distillation.

The reaction mixture is ordinarily heated with stirring while the system is purged with an inert gas, e.g. nitrogen. The temperature of the reaction is usually maintained between about 185 and 205° C. The reaction can be terminated when the acid number of the reaction mixture has decreased to below 30, preferably between about 20 and about 30. The reaction time may vary accordingly but frequently may result in a reaction period of about 5 to about 6 hours.

The unsaturated polyester resinous products of the present invention advantageously may be copolymerized with various reactive monovinyl aromatic compounds, such as styrene, ortho-, meta-, and para-methyl styrenes, ar-ethyl styrene, and ar-chlorostyrene in the presence of a peroxygen polymerization catalyst such as benzoyl peroxide, methylethylketone peroxide, cumene hydroperoxide, and azoisobutyric acid nitrile, to form polyester resinous compositions capable of being employed as electrical potting and casting compositions, and as liquid polymers particularly adapted to be used as binding agents to envelope and polymerize with many types of inert filler materials for the production of laminated articles.

The advantages of the present invention may be better understood from a consideration of the following experimental data. The examples are given for the sake of illustration, but without intending to limit the scope of the invention, for there are, of course, numerous possible variations and modifications. All parts and percentages are by weight unless otherwise indicated in the examples.

EXAMPLE I

Part A

About 346 grams (1 equivalent) of 1,1'-isopropylidenebis(p-phenyleneoxy)-bis(2,3-epoxypropane) having an epoxide number of 173, were dissolved in about 200 grams of toluene in a reaction vessel equipped with means for stirring and heating, a thermometer, and an addition funnel. Approximately 115 grams (1.15 equivalents) of a solution containing about 36.5 weight percent of hydrochloric acid in water was added gradually through the addition funnel to the other reactants. The reactants were cooled by external means to control the heat of the exothermic reaction which occurs. The temperature was allowed to rise to about 40° C. and was maintained at this temperature for about 1 hour at substantially atmospheric pressure. A mixture of toluene with water of reaction was distilled off under vacuum while the temperature was steadily increased to about 120° C. The reaction product, 1,1'-isopropylidenebis(p-penyleneoxy)bis(2-chloropropanol), was a viscous liquid weighing 417.5 grams. The yield of said product was about 99.6 percent based on the weight of the diepoxide compound initially employed. The observed chlorine content of the dihydric alcohol product was about 16.3 percent (calculated 16.9 percent). The observed hydroxyl content was about 8.34 percent as compared with the calculated 8.23 percent hydroxyl content of dihydric alcohol.

Part B

About 268.5 grams (1.31 equivalents) of 1,1'-isopropylidenebis(p-phenyleneoxy)bis(2-chloropropanol) prepared in Part A above were admixed in a suitable reaction vessel with about 57.3 grams (1.17 equivalents) of maleic anhydride. The reaction vessel was equipped with means for stirring and heating, a thermometer, a Dean-Stark water trap, a reflux condenser, and a gas inlet tube. The water trap was filled with xylene. An addition quantity of xylene, about 5 cc., was added to assist in the removal of the water formed in the reaction. Xylene admixed with the water to form azeotropes during the course of the reaction were removed from the reaction medium by means of azeotropic distillation. The temperature of the reactants was maintained in a range of between about 185° C. and about 205° C. for about 5.5 hours under a nitrogen atmosphere. During this time, the acid number of the reactants was reduced to about 22 and the reaction was terminated. The unsaturated polyester product consisting of the reaction product of the 1,1'-isopropylidenebis(p-phenyleneoxy)bis(2-chloropropanol) and the maleic anhydride had a chlorine content of about 13.2 percent, the calculated chlorine content being 13.7 percent.

EXAMPLE II

Part A

Employing the procedure of Example I, Part A, about 382.5 grams of 1,1' - isopropylidenebis(tetrachloro - p-phenyleneoxy)bis(2,3-epoxypropane) having an epoxide number of 285 was dissolved in about 200 grams of toluene. The solution was caused to react with about 175 grams of an aqueous 36.5 percent solution of hydrochloric acid. The yield of the reaction product, 1,1'-isopropylidenebis(tetrachloro - p - phenyleneoxy)bis(2 - chloropropanol), a substituted dihydric alcohol, was 431.5 grams, representing a 100 percent yield. The product had a hydroxyl content of about 6.49 percent as against the calculated hydroxyl content of the pure dihydric alcohol which is 6.18 percent.

Part B

About 275.5 grams (1.06 equivalents) of 1,1'-isopropylidenebis(tetrachloro-p-phenyleneoxy) - bis(2 - chloropropanol) of Part A were mixed with about 44.1 grams (0.9 equivalent) of maleic anhydride and caused to esterify using the method of Example I, Part B. The reaction was stopped when the reaction mixture had reached an acid number of 20. The resulting polyester reaction product of 1,1'-isopropylidenebis(tetrachloro - p - phenyleneoxy)bis(2-chloropropanol) and maleic anhydride had a chlorine content of about 32.4 percent as compared with a calculated theoretical chlorine content of 33.8 percent.

EXAMPLE III

Part A

Employing the procedures of Example I, Part A, about 384 grams of 1,1'-isopropylidene(tetrabromo - p - phenyleneoxy)bis(2,3-epoxypropane) having an epoxy equivalent weight of 384 were dispersed in about 200 grams of toluene. The dispersion, when reaching the solution stage, was allowed to react with about 115 grams of an aqueous 36.5 percent hydrochloric acid solution. About 418.6 grams of a solid product were obtained which represented a yield of about 99.8 percent as based on the calculated theoretical yield of 420.5 grams. The resin, 1,1'-isopropylidenebis(tetrabromo - p - phenyleneoxy)bis(2 - chloropropanol), had a hydroxyl content of about 5.08 percent in contrast to the 4.67 percent hydroxyl content of the pure dihydric alcohol.

Part B

Repeating the method of Example I, Part B, about 277 grams (0.827 equivalent) of the solid resin, 1,1'-isopropylidenebis(tetrabromo - p - phenyleneoxy)bis(2 - chloropropanol), prepared in Part A above, were reacted with about 33.5 grams (0.63 equivalent) of maleic anhydride. When the reactants had attained an acid number of 21, the reaction was concluded.

EXAMPLE IV

Part A

About 354 grams of 1,1'-isopropylidenebis(dichloro-p-phenyleneoxy)bis(2,3-epoxypropane), having an epoxide number of 221 were reacted with about 184 grams of 36.5 percent hydrochloric acid while in solution in about 200 grams of toluene. The reaction proceeded smoothly using the method of Example I, Part A. Theoretically, the product yield should have been 412 grams. The quantity of reaction product, 1,1'-isopropylidenebis(dichloro-p-phenyleneoxy)bis(2-chloropropanol), obtained in this run was about 414 grams. The percentage hydroxyl content of the product was about 7.21. The theoretical hydroxyl content calculated for the pure dihydric alcohol is 7.06 percent.

Part B

The procedures of Example I, Part B, were employed taking about 265 grams (1.12 equivalents) of the 1,1'-isopropylidenebis(dichloro - p - phenyleneoxy)bis(2 - chloropropanol) product, prepared in Part A above, and about 48.5 grams (0.99 equivalent) of maleic anhydride. The reactants were admixed and the reaction was allowed to progress until the reaction mixture had an acid number of 20.

EXAMPLE V

Part A

Into a suitable size reaction vessel equipped with means of agitation and heating, a thermometer and a reflux condenser were charged approximately the given quantities of:

1,1'-isopropylidenebis(tetra-
  bromo-p-phenol) _____ 218 grams (0.8 equivalent).
Epichlorohydrin _____ 370 grams (4 equivalents).
Triethylamine _____ 1.2 milliliters.

The reaction was allowed to progress for about 6.5 hours while controlling the temperature of the reactants at approximately 80° C. The unreacted epichlorhydrin was distilled off under vacuum by raising the temperature of the reaction mixture to about 130° C. The yield of reaction product at this point was about 283.7 grams. Theoretically, the product yield should have been 292 grams.

The 8.3 gram difference between the actual yield and the theoretical yield was the result of a dehydrochlorination side reaction causing a portion of the intermediate chlorohydrin product to convert to the corresponding epoxy product. The addition of a small quantity of hydrochloric acid reverted the epoxy groups to chlorohydrin groups. A minimum of 0.228 mole of hydrochloric acid was required to accomplish the reversion.

About 150 grams of toluene, about 28 grams (0.28 mole) of 36.5 weight percent of hydrochloric acid in water was admixed with about 283.7 grams of the epoxy reaction product obtained above; the mixture was warmed again to a temperature of about 80° C. for an additional hour allowing the hydrochloric acid to react. The toluene, water and unreacted hydrochloric acid were removed from the system by distillation. The resulting reaction product, 1,1'-isopropylidenebis(tetrabromo-p - phenyleneoxy)bis(2-chloropropanol), at this point amounted to about 392.5 grams representing substantially a quantitative yield of the dihydric alcohol. The product had a hydroxyl content of about 5.15 percent.

Part B

About 277 grams (0.836 equivalent) of 1,1'-isopropylidenebis(tetrabromo - p - phenyleneoxy)bis(2 - chloropropanol), prepared in Part A above, were reacted with about 33.5 grams (0.63 equivalent) of maleic anhydride according to the procedures of Example I, Part B. The reaction was terminated when the reactants attained an acid number of 28.

EXAMPLE VI

Part A

Employing procedures of Example V, Part A, approximate quantities of the following ingredients were mixed and reacted:

1,1'-isopropylidenebis-
  (tetrachloro-p-phenol)__ 183 grams (1 equivalent).
Epichlorohydrin _____ 462.5 grams (5 equivalents).
Triethylamine _____ 1.5 milliliters.

A product yield of about 276.5 grams, representing a 100.8 percent yield, was obtained after the unreacted epichlorohydrin was removed from the reaction system by distillation. The theoretical product yield was calculated to be 275.5 grams.

Part B

About 236.7 grams (0.927 equivalent) of the product, 1,1' - isopropylidenebis(tetrachloro-p-phenyleneoxy)bis-(2-chloropropanol), obtained from the reaction of Part A above were combined with about 3.1 grams (0.10 equivalent) of ethylene glycol. When about 44.1 grams (0.9 equivalent) of maleic anhydride were added to the dihydric alcohol-glycol ingredients, a reaction commenced in the manner of Example I, Part B. The reaction was allowed to progress until the reaction mixture attained an acid number value of 20.

EXAMPLE VII

The polyester resinous reaction products obtained as the final products of the six foregoing examples were each in turn diluted with styrene monomer (inhibited with 600 p.p.m. of p-tert.-butyl catechol) to a 40 weight percent solution as based on the resin solids. With the addition of 1 percent by weight of benzoyl chloride, these solutions were suitable as binding compositions for the preparation of laminates.

The Gardner color comparisons of 40 percent styrene solutions of the six polyesters prepared in the foregoing examples are as follows:

| Polyester of maleic anhydride and: | Gardner color |
|---|---|
| 1,1'-isopropylidenebis(p-phenyleneoxy)bis(2-chloropropanol) | 4–5 |
| 1,1' - isopropylidenebis(tetrachloro-p-phenyleneoxy)bis(2-chloropropanol) | 4–5 |
| 1,1' - isopropylidenebis(tetrabromo-p-phenyleneoxy)bis(2-chloropropanol) | 6–7 |
| 1,1' - isopropylidenebis(dichloro-p-phenyleneoxy)bis(2-chloropropanol) | 3–4 |
| 1,1' - isopropylidenebis(tetrabromo-p-phenyleneoxy)bis(2-chloropropanol) | 11–12 |
| 1,1' - isopropylidenebis(tetrachloro-p-phenyleneoxy)bis(2-chloropropanol) | 10–11 |

Standard size fiber-glass/resin-laminated test panels were prepared in a 4.5 inch by 4.5 inch by 0.125 inch in depth copper mold conventionally employed in the standard process of compression molding laminated test panels. In accordance with this process, the mold form is completely filled with the following materials in a series of nine sequential steps. (1) A clean steel panel was provided as a bottom for the copper mold (4.5 inch by 4.5 inch by ⅛ inch deep) and was first placed under the mold. (2) A 4.5 inch by 4.5 inch by 13 mil glass cloth veil was placed in the mold on top of the steel plate. (3) The glasscloth veil was saturated with a portion of the 40 percent polyester resin dissolved in styrene. (4) A middle layer of about 1.5 ounces of glass mat filler was shaped and fitted into the mold. (5) More of the instant polyester resin solution was poured into the mold to saturate the glass mat filler. (6) The resin saturated glass mat filler was topped by a second piece of glasscloth veil the same as employed in Step 2 above. (7) Again, the glasscloth veil was saturated with the instant polyester resin solution. (8) The mold was filled to overflowing with more of the polyester resin solution. (9) Finally, a second clean steel panel was securely placed over the top opening of the mold whereupon the excess polyester solution was forced out of the mold.

Individual fiber-glass panels, constructed according to the above described process, were saturated with one of each of the resinous binding compositions described above. The resin-saturated, glass fiber moldings were cured in a heated press at a temperature of about 225° F. for approximately 15 minutes under moderate pressure. The cured laminates were strong, light colored, and lacked any noticeable defects.

These laminates have novel slow-burning and self-extinguishing characteristics which are due to the halogen content of the cyclic aliphatic or aromatic polyhaloalkane polyol starting material. Similar results are obtained by employing other vinyl aromatic compounds such as vinyltoluene, vinylxylene, chlorostyrene, or ethylstyrene for the styrene used in specific formulations.

EXAMPLE VIII

Part A

A solution was made of about 112 grams (1.6 equivalents) of vinylcyclohexene dioxide and about 120 grams of toluene. The solution was prepared in a round bottom glass flask of a suitable size equipped with a means of stirring, a thermometer, and an additional funnel. About 184 grams (1.84 equivalents) of a 36.5 percent solution of hydrochloric acid in water was added gradually through the addition funnel. The reaction flask was cooled externally to control the exothermic reaction which occurred during the acid addition. The temperature was allowed to rise and was maintained at about 63° C. for about 1 hour. The toluene and water were then distilled off under vacuum while the temperature was permitted to rise to about 120° C. The reaction product was a semi-solid material weighing 154.3 grams. The yield of said product was about 90.5 percent. The product had an observed hydroxyl content of 17.9 percent.

Part B

About 113 grams (1.19 equivalents) of the vinylcyclohexene dichloride reaction product of Part A above were admixed with about 49.8 grams (1.01 equivalents) of maleic anhydride and the esterification reaction was accomplished by the procedures of Example I, Part B.

The reaction was terminated when the reaction mixture became thick at about 195° C. The polyester reaction product of vinylcyclohexene dichloride and maleic anhydride was diluted with styrene monomer (inhibited with 600 p.p.m. of p-tert.-butyl catechol) to a 40 weight percent solution as based on the resin solids. The styrene polyester solution had a Gardner color of from about 13–14. After the addition of about 1 percent by weight of benzoyl peroxide, resin saturated glasscloth laminates were cured in an identical manner as described in Example VII. The laminates were slightly brittle, but strong.

EXAMPLE IX

To further illustrate the value of the polyesters of the present invention as electrical potting and casting materials, the polyester reaction product of 1,1'-isopropylidenebis(p - phenyleneoxy)bis(2 - chloropropanol) and maleic anhydride was diluted to about a 40 weight percent solution with inhibited styrene monomer. To the polyester-styrene solution was added about 1.0 percent by weight of benzoyl peroxide. The polyester solution was poured into a glass container and was subjected to freezing temperatures for several weeks. Thereafter, upon examination, it was observed that the polyester resin had cured into a solid mass. An additional oven cure of about 30 minutes at about 225° F. resulted in a strong, clear casting having a light, yellow color.

As a further exemplification that other of the types of polyesters of the present invention are good electrical potting and casting resins, the polyester reaction product of vinylcyclohexene chlorohydrin and maleic anhydride of Example VIII was diluted to about a 40 percent solution with inhibited styrene monomer to which was added about 1.0 percent of benzoyl peroxide as a catalyst. The polyester solution was poured into a glass container and was allowed to set at substantially room temperature for about 4 days. The polyester resin had cured completely except for a slight tackiness which was eliminated by an additional oven cure of about 30 minutes at about 225° F. The resulting cured polyester resin produced a strong casting.

Although the unsaturated dicarboxylic acid constituent employed to advantage in the preparation of the cyclic aliphatic polyhaloalkane polyol polyesters and the aromatic polyhaloalkane polyol polyesters of the present invention was maleic anhydride, other polyester products having similar beneficial properties are obtained by substituting in the foregoing esterification reactions comparable unsaturated dicarboxylic acids or anhydrides such as fumaric, itaconic and citraconic acids and itaconic and citraconic anhydrides in substantially the same chemically equivalent proportions.

Finally, let it be understood that the products of the instant invention are not to be limited to the exact proportions of the materials listed in this specification or to the exact materials or chemicals used, and that, obviously, equivalents of such materials may be used without departing from the spirit or the scope of the present invention.

What is claimed is:

1. A resinous polyester comprising the reaction product of substantially chemically equivalent proportions of (A) a cyclic polyhaloalkane polyol selected from the group consisting of (1) aromatic polyhaloalkane polyols having the general formula:

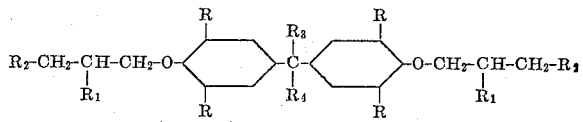

wherein R represents a member of the group consisting of H, Cl and Br, $R_1$ is a member of the group consisting of chlorine and bromine and $R_2$ is OH, and $R_3$ and $R_4$ each represents a member of the group consisting of H and lower alkyl radicals containing from 1 to 4 carbon atoms, and (2) cyclic aliphatic polyhaloalkane polyols having the general formula:

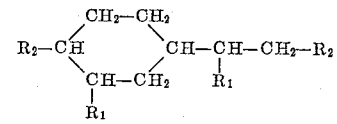

wherein $R_1$ is a member of the group consisting of chlorine and bromine and $R_2$ is OH, and (B) an unsaturated dicarboxylic acid compound selected from the group consisting of maleic acid, fumaric acid, itaconic acid, citraconic acid, maleic anhydride, itaconic anhydride and citraconic anhydride.

2. A polyester of claim 1, wherein said cyclic polyhaloalkane polyol is 1,1'-isopropylidene-bis(tetrabromo-p-phenyleneoxy)bis(2-chloropropanol).

3. A polyester of claim 1, wherein said cyclic polyhaloalkane polyol is 1,1'-isopropylidene-bis(tetrachloro-p-phenyleneoxy)bis(2-chloropropanol).

4. A polyester of claim 1, wherein said cyclic polyhaloalkane polyol is 1,1'-isopropylidene-bis(phenyleneoxy)bis(2-chloropropanol).

5. A resinous polyester comprising the reaction product of substantially chemically equivalent proportions of 1,1'-isopropylidene - bis(tetrabromo-p-phenyleneoxy)bis(2 - chloropropanol) and maleic anhydride.

6. A resinous polyester comprising the reaction product of substantially chemically equivalent proportions of 1,1'-isopropylidene bis(tetrachloro - p - phenyleneoxy)bis(2 - chloropropanol) and maleic anhydride.

7. A resinous polyester comprising the reaction product of substantially chemically equivalent proportions of 1,1'-isopropylidene - bis(phenyleneoxy)bis(2-chloropropanol) and maleic anhydride.

8. A resinous polyester comprising the reaction product of substantially chemically equivalent proportions of a mixture consisting of a major proportion of 1,1'-isopropylidenebis(tetrachloro - p - phenyleneoxy)bis(2 - chloropropanol) and a minor proportion of an aliphatic diol on a molar basis with approximately 1.0 mole of maleic anhydride.

References Cited in the file of this patent

UNITED STATES PATENTS

| | | |
|---|---|---|
| 2,449,956 | Shokal | Sept. 21, 1948 |
| 2,902,518 | Hurdis | Sept. 1, 1959 |
| 2,973,339 | Muenster | Feb. 28, 1961 |
| 2,981,754 | Wynn | Apr. 25, 1961 |
| 3,060,146 | Wismer | Oct. 23, 1962 |